Patented Aug. 25, 1936

2,052,170

UNITED STATES PATENT OFFICE 2,052,170

SIZING COMPOSITION AND PROCESS OF MAKING SAME

Max Engelmann, Wilmington, Del., assignor to Bayer-Semesan Company, New York, N. Y., a corporation of Delaware No Drawing. Application April 13, 1931, Serial No. 529,786

10 Claims. (Cl. 134—21)

This invention relates to dispersing agents, and more particularly to stickers and spreaders for insecticides and disinfectant compositions, and for the sizing of paper.

It has been the practice in the control of plant diseases and insect pests to use in combination with products for this purpose, materials which increase the sticking and dispersing properties. Stickers and spreaders that have been well known for this purpose have comprised casein, fatty acid soaps, and resin soaps that consist of the alkali salts of abietic acid which is the principal constituent of the ordinary rosin of commerce. Rosin soaps heretofore, however, have been prepared only in liquid form in solutions or suspensions, or in paste form. Alkali salts of resins have not heretofore been used as dry products principally because of the fact that alkali abietate salts are very unstable chemical compounds in dry form and for this reason are not manufactured for technical use. It has been the practice, when a rosin soap is needed (for any purpose) to make up the amount desired for immediate use by boiling rosin with alkali hydrate or alkali carbonate. Casein has been used as a spreader or sticker principally in combination with hydrated lime, but this material is too expensive for general use.

A principal object of my present invention is to produce a material for this purpose that is more satisfactory than any heretofore proposed. A further object of my invention is to simplify the application of materials having sticker and spreader qualities. A still further object of my invention is to produce a stable product, and one that is convenient to apply. Other objects will be apparent as the description proceeds.

These objects are accomplished by the following invention in which I have found that if any natural resin containing abietic acid, such, for example, as ordinary pine rosin in dry form, is ground with an alkali in dry form, such, for example, as caustic soda, sodium carbonate, sodium silicate, or the corresponding potassium salts, in the proper proportions, stable powders are obtained which form rosin soaps instantly when added to cold water. In place of the alkali itself, mixtures of salts that generate alkali in contact with water may be used, such, for example, as a mixture of hydrated lime and sodium carbonate, or barium hydrate and sodium sulfate.

The following examples of specific embodiments are given to further illustrate my invention, but it is to be understood that these are not to be taken as limitations thereof.

*Example 1*

A mixture of 250 parts of rosin and 750 parts of soda ash are ground in a ball mill until it is reduced to a very fine powder, which requires about five hours. This material when put in water dissolves immediately to a solution of sodium abietate (rosin soap).

*Example 2*

Two-hundred-fifty parts of rosin and seven hundred parts of dry sodium silicate are ground for six hours in a ball mill.

*Example 3*

A mixture of three hundred parts of rosin, seven hundred parts of soda ash and two hundred parts of hydrated lime are ground for six hours in a ball mill.

Similar products can be obtained by mixing rosin and sodium borate, or the same with barium hydrate and potassium sulfate, or with calcium hydrate and sodium fluoride. The latter mixtures are examples of materials capable of generating free alkali in contact with water.

These materials may be added to agricultural poisons like calcium arsenate, lead arsenate, dry Bordeaux mixture, sulfur, Paris green, chlorophenol mercury acetate, orthonitrophenol mercury sulfate, phenyl mercury chloride, ethyl mercury hydroxide, etc., at a percentage of two up to ten per cent. Sulfur, for instance, containing 2 per cent of the product described in Example 3 gives a so-called "wettable-sulfur" of unusual sticking and dispersing properties if dusted on the foliage of plants. A fungicide containing phenyl mercury acetate, resin, sodium silicate and sodium hydrate, has an unusual sticking property if applied in dry or liquid form on the foliage of plants.

Because of the fact that these materials, when added to water, give immediately a solution of rosin soap, they are well adapted for use in all cases where rosin soap is required, for instance, as insecticides for the control of insects like aphis, etc.

These products have the advantage that, as soon as they come in contact with water, they form rosin soap and in doing so the cumbersome and troublesome method of boiling rosin with soda ash or other alkalies, can be avoided.

When these materials are used in combination with insecticides, it is not necessary to prepare the products separately. The agricultural poison can be ground with the calculated amount of rosin and alkali.

As many apparently widely different embodiments of this invention may be made without departing from the spirit thereof, it is to be understood that I do not limit myself to the foregoing examples or descriptions except as indicated in the following patent claims.

I claim:

1. The process of producing a rosin soap forming composition which comprises reducing to powdered form, by prolonged attrition upon each other, abietic acid containing material and an alkaline material, both in a dry state, the alkaline material being in an amount substantially greater than that of the abietic acid containing material.

2. The process of producing a rosin soap forming composition which comprises reducing to powdered form, by prolonged attrition upon each other, a natural resin containing abietic acid and an alkaline material, both in a dry state, the alkaline material being in an amount substantially greater than that of the resin.

3. The process of producing a rosin soap forming composition which comprises reducing to powdered form, by prolonged attrition upon each other, pine rosin and an alkaline material, both in a dry state, the alkaline material being in an amount substantially greater than that of the rosin.

4. The process of producing a rosin soap forming composition which comprises reducing to powdered form, by prolonged attrition upon each other, abietic acid containing material and a salt capable of generating alkali in the presence of water at room temperature and below, both in a dry state, the salt being in an amount substantially greater than that of the abietic acid containing material.

5. The process of producing a rosin soap forming composition which comprises reducing to powdered form, by prolonged attrition upon each other, a natural resin containing abietic acid and a salt capable of generating alkali in the presence of water at room temperature and below, both in a dry state, the salt being in an amount substantially greater than that of the resin.

6. A rosin soap forming composition comprising an admixture of finely divided abietic acid containing material and an alkaline material in an amount substantially greater than that of the abietic acid containing material, such composition having essential characteristics imparted by reducing the said ingredients to powdered form by prolonged attrition of the same upon each other while in a dry state.

7. A rosin soap forming composition comprising an admixture of finely divided abietic acid containing material and salts capable of generating alkali in the presence of water at room temperature and below in an amount substantially greater than that of the abietic acid containing material, such composition having essential characteristics imparted by reducing the said ingredients to powdered form by prolonged attrition of the same upon each other while in a dry state.

8. A sizing material for paper comprising abietic acid containing material and an alkaline material in an amount substantially greater than that of the abietic containing material, in powdered form, such sizing material having essential characteristics imparted by reducing the said ingredients to powdered form by prolonged attrition of the same upon each other while in a dry state.

9. A sizing material for paper comprising a natural resin containing abietic acid and an alkaline material in an amount substantially greater than that of the resin, in powdered form, such sizing material having essential characteristics imparted by reducing the said ingredients to powdered form by prolonged attrition of the same upon each other while in a dry state.

10. A sizing material for paper comprising pine rosin and an alkaline material in an amount substantially greater than that of the rosin, in powdered form, such sizing material having essential characteristics imparted by reducing the said ingredients to powdered form by prolonged attrition of the same upon each other while in a dry state.

MAX ENGELMANN.